(12) United States Patent
Farley et al.

(10) Patent No.: US 9,462,752 B2
(45) Date of Patent: Oct. 11, 2016

(54) HARVESTER WITH CLEANING SYSTEM HAVING EARLY CLEAN GRAIN EVACUATION

(75) Inventors: Herbert M. Farley, Elizabethtown, PA (US); Curtis F. Hillen, Lititz, PA (US); Frank R. G. Duquesne, Zwevegem (BE); Thierry Devriese, Brugge (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/238,706

(22) PCT Filed: Aug. 22, 2012

(86) PCT No.: PCT/US2012/051845
§ 371 (c)(1),
(2), (4) Date: Feb. 12, 2014

(87) PCT Pub. No.: WO2013/028748
PCT Pub. Date: Feb. 28, 2013

(65) Prior Publication Data
US 2014/0200057 A1     Jul. 17, 2014

Related U.S. Application Data

(60) Provisional application No. 61/575,486, filed on Aug. 22, 2011.

(51) Int. Cl.
*A01F 12/48* (2006.01)
*B07B 1/50* (2006.01)
*B08B 5/00* (2006.01)
*A01F 12/44* (2006.01)

(52) U.S. Cl.
CPC ............. *A01F 12/444* (2013.01); *A01F 12/44* (2013.01); *A01F 12/446* (2013.01)

(58) Field of Classification Search
CPC .. A01D 12/44; A01D 75/282; A01F 12/442; A01F 12/444; A01F 12/446; A01F 12/46
USPC .............. 460/100, 114, 119, 67, 99; 56/14.6
See application file for complete search history.

(56) References Cited

U.S. PATENT DOCUMENTS

| 402,462 | A |   | 4/1889  | Laufenburg |
|---------|---|---|---------|------------|
| 910,477 | A |   | 1/1909  | Robinson   |
| 1,021,917 | A |   | 4/1912 | Cooper     |
| 1,064,440 | A |   | 6/1913 | Brown      |
| 1,082,191 | A |   | 12/1913 | George    |
| 1,852,361 | A | * | 4/1932 | Naffziger ................ A01F 12/44 209/416 |
| 1,917,536 | A |   | 7/1933 | McIntire   |
| 2,292,650 | A | * | 8/1942 | Oehler .................... A01F 12/44 198/669 |
| 2,303,249 | A | * | 11/1942 | Ashton ................... A01F 12/44 209/151 |

(Continued)

*Primary Examiner* — Árpád Fábián-Kovács
(74) *Attorney, Agent, or Firm* — Patrick M. Sheldrake

(57) ABSTRACT

A clean grain evacuation device for a grain harvester having a threshing system configured to separate grain harvested by the harvester from crop residue and direct a flow of the grain to a cleaning system disposed within the harvester including at least two sieves disposed and configured to sequentially clean the grain. The evacuation device is disposed for receiving a portion of the flow of the clean grain from a first of the sieves, and is configured to evacuate the received clean grain away from the cleaning system. The evacuation device can include a conveyor disposed for directing the evacuated grain directly to a desired location such as a clean grain receiving system on the harvester. The evacuation device can also be located in an air flow path to the sieves.

16 Claims, 8 Drawing Sheets

(56) References Cited

U.S. PATENT DOCUMENTS

| | | | | |
|---|---|---|---|---|
| 2,609,929 A * | 9/1952 | King | | 209/135 |
| 2,937,647 A * | 5/1960 | Allen | | A01F 12/44 |
| | | | | 460/85 |
| 3,043,427 A * | 7/1962 | Eisert | | 209/26 |
| 3,334,739 A * | 8/1967 | Jarvis | | 209/19 |
| 3,373,871 A * | 3/1968 | Huether | | 209/284 |
| 3,580,257 A * | 5/1971 | Teague | | 460/102 |
| 3,664,349 A * | 5/1972 | Quick | | 460/99 |
| 3,760,813 A * | 9/1973 | Mathews | | 460/119 |
| 3,800,804 A * | 4/1974 | Boone | | A01F 12/444 |
| | | | | 415/53.3 |
| 3,982,549 A | 9/1976 | De Pauw et al. | | |
| 4,062,366 A * | 12/1977 | De Coene | | A01D 41/12 |
| | | | | 460/14 |
| 4,067,343 A * | 1/1978 | Muijs | | A01D 41/12 |
| | | | | 198/642 |
| 4,208,858 A * | 6/1980 | Rowland-Hill | | 56/14.6 |
| 4,250,897 A * | 2/1981 | Glaser | | A01D 67/00 |
| | | | | 415/7 |
| 4,353,376 A * | 10/1982 | Schuler | | 460/67 |
| 4,359,058 A * | 11/1982 | Rusanov | | A01F 12/442 |
| | | | | 460/100 |
| 4,401,128 A | 8/1983 | Fisher | | |
| 4,444,208 A * | 4/1984 | Raineri | | 460/74 |
| 4,450,671 A * | 5/1984 | Love | | A01F 12/30 |
| | | | | 460/16 |
| 4,531,528 A | 7/1985 | Peters et al. | | |
| 4,541,441 A * | 9/1985 | Ichikawa et al. | | 460/66 |
| 4,821,744 A * | 4/1989 | Turner | | A01F 12/444 |
| | | | | 460/100 |
| 4,897,071 A | 1/1990 | Desnijder et al. | | |
| 4,906,219 A * | 3/1990 | Matousek | | A01F 12/444 |
| | | | | 415/203 |
| 4,968,285 A | 11/1990 | Schuhmacher | | |
| 5,098,341 A * | 3/1992 | Kuchar | | 460/99 |
| 5,176,574 A | 1/1993 | Matousek et al. | | |
| 5,387,154 A * | 2/1995 | Peters | | A01F 12/444 |
| | | | | 460/100 |
| 5,443,352 A * | 8/1995 | Schuhmacher | | 414/526 |
| 5,519,987 A * | 5/1996 | Voss | | A01D 41/02 |
| | | | | 460/83 |
| 5,624,315 A * | 4/1997 | Jonckheere | | 460/99 |
| 5,769,712 A * | 6/1998 | Honas | | A01F 12/442 |
| | | | | 460/114 |
| 6,192,664 B1 * | 2/2001 | Missotten et al. | | 56/10.2 R |
| 6,350,197 B1 * | 2/2002 | Cooksey et al. | | 460/114 |
| 6,422,937 B1 * | 7/2002 | McLeod et al. | | 460/12 |
| 6,669,558 B1 * | 12/2003 | Wolters et al. | | 460/14 |
| 6,672,957 B2 | 1/2004 | Voss et al. | | |
| 6,974,384 B2 * | 12/2005 | Schmidt | | 460/114 |
| 7,040,980 B1 | 5/2006 | Kestel | | |
| 7,413,507 B2 | 8/2008 | Weichholdt | | |
| 7,427,232 B2 | 9/2008 | Schmidt et al. | | |
| 7,524,242 B2 * | 4/2009 | Stukenholtz et al. | | 460/115 |
| 7,566,266 B1 | 7/2009 | Ricketts et al. | | |
| 7,690,973 B2 | 4/2010 | Becker et al. | | |
| 7,717,779 B1 | 5/2010 | Weichholdt et al. | | |
| 7,731,578 B2 | 6/2010 | Birrell et al. | | |
| 7,833,091 B2 | 11/2010 | Holtmann et al. | | |
| 2005/0096108 A1 * | 5/2005 | Van Quekelberghe | | A01F 7/067 |
| | | | | 460/66 |
| 2007/0256403 A1 * | 11/2007 | Teroerde et al. | | 56/16.5 |
| 2009/0264169 A1 * | 10/2009 | Ricketts | | 460/101 |
| 2009/0280876 A1 * | 11/2009 | Yoder et al. | | 460/100 |
| 2010/0144412 A1 * | 6/2010 | Schwinn | | 460/99 |
| 2011/0072773 A1 | 3/2011 | Schroeder et al. | | |
| 2012/0108302 A1 * | 5/2012 | Stukenholtz | | A01F 12/44 |
| | | | | 460/79 |

* cited by examiner

HARVESTER WITH CLEANING SYSTEM HAVING EARLY CLEAN GRAIN EVACUATION

This application is the U.S. National Stage filing of International Application Ser. No. PCT/US2012/051845 filed on Aug. 22, 2012 which claims priority to U.S. Provisional Application No. 61/575,486, filed Aug. 22, 2011, each of which is incorporated herein by reference in its entirety.

TECHNICAL FIELD

This invention relates generally to a grain harvester, and more particularly, having a cleaning system with an early clean grain evacuation device for removing grain from the flow being cleaned, to effectively increase the cleaning capacity, without increasing the area or size of sieves of the cleaning system.

BACKGROUND ART

The disclosure of U.S. Provisional Application No. 61/575,486, filed Aug. 22, 2011, is hereby incorporated herein in its entirety by reference.

It is common for harvester customers and operators to desire increased capacity and productivity from their harvesters. However, chassis configurations limit the area available for increasing cleaning sieve size. Increasing width is typically the easiest manner of increasing sieve size. However, many jurisdictions limit overall vehicle width and weight which places a limitation of the extent of increase possible. Also, cost is a constraint as is power train capacity.

Another avenue for increasing productivity is to reduce material other than grain or MOG that reaches the cleaning system, referred to as pre-separation. However, this approach has limitation for some grains and harvesting conditions, e.g., most effective when the difference between terminal velocity of the grain and that of the MOG is greatest. Another constraint is that increasing pre-separation increases space required for that process, and this space must come from other systems such as the threshing or separation system for separating grain from larger MOG.

The cleaning system of a combine harvester typically includes at least one fan operable for directing a flow of air upwardly and rearwardly through at least two sieves reciprocatingly moving in at least one plane of motion. This general configuration provides a winnowing action to mechanically and pneumatically separate the less dense MOG from the denser grain. More specifically many known harvesters use a fan and split ducts to direct the flow of air through a forward pre-cleaning duct to a grain cascading area having a first or pre-sieve for removing some of the MOG, and through a second or rear duct to the main cleaning sieves including a first or upper sieve or chaffer, and a second or lower cleaning sieve through which all of the clean grain passes en route to a clean grain conveyor which carries the cleaned grain to a holding tank or other container.

What is sought is a manner of increasing grain handling capacity for known cleaning system configurations, which does not require space from other systems, does not significantly increase the cleaning system size, and overcomes one or more of the shortcomings and limitations set forth above.

SUMMARY OF THE INVENTION

What is disclosed is a grain harvester having a clean grain evacuation device which provides increased grain handling capacity for known cleaning system configurations, requires no or only minimal space from other systems, does not significantly increase the cleaning system size, and overcomes one or more of the shortcomings and limitations set forth above.

According to a preferred aspect of the invention, a grain harvester will have a threshing system configured to separate grain harvested by the harvester from crop residue and direct a flow of the grain to a cleaning system disposed within the harvester including at least two sieves disposed and configured to sequentially clean the grain. At least one location or region the first of the sieves will adequately clean the grain without requiring additional passage through and cleaning by the second of the sieves. The clean grain evacuation device is disposed and configured to receive all or a portion of the adequately cleaned grain from the first of the sieves, and evacuate the received portion of the cleaned grain from the cleaning system. The evacuation device can be passive, and remove the received cleaned grain via gravity alone, or can be completely or partially active, using a powered device for some or all of the grain transport.

The two involved sieves can include a pre-sieve and a chaffer or upper sieve, or a chaffer sieve and a lower cleaning sieve, as desired or required for a particular application, and thus is not limited to the first sieve of the cleaning system. More than one of the grain evacuation devices can be employed, at suitable desired locations in relation to the cleaning system, also as desired or required for a particular application. As a non-limiting example, additional evacuation devices can be employed at different locations between the same sieves; or evacuation devices may be employed between different sieves, such as between a pre-sieve and a chaffer or upper sieve, and between the chaffer sieve and an lower cleaning sieve, as desired or required to achieve desired clean grain evacuation for a particular application.

According to another preferred aspect of the invention, the cleaning system includes at least one fan configured and operable for directing a flow of air through the sieves and through the space between the sieves, and the grain evacuation device is disposed at an upstream location in or before that space. This has been found to be advantageous, as it increases the concentration of the air flow in more downstream regions of the sieves, that is, more rearwardly along the sieves for most applications, for better cleaning effect.

According to another preferred aspect of the invention, the harvester has a clean grain receiving system disposed and configured for receiving a flow of the grain cleaned by a last of the sieves of the sequence, and the evacuation device is configured to direct the evacuated grain to the clean grain receiving system. More preferably, the clean grain receiving system includes a clean grain conveyor and the evacuation device deposits the evacuated grain in the clean grain conveyor, at a location different from entry of the grain cleaned by the last of the sieves, preferably downstream of that location to avoid overloading the clean grain receiving system.

The active or powered grain moving or transport function of the evacuation device, if used, can include a conveyor such as one or more of a helical auger, belt, pneumatic, or other type of conveyor, configured and operable for evacuating the grain at the required rate and volume for a particular application. Gravity or another conveyor or conveyors can then be used to transport the evacuated grain to the desired location, e.g., the clean grain receiving system, clean grain tank, or a separate device such an accompanying grain holding trailer, cart or the like.

As an advantage, cleaning system productivity and throughput has been found to be increased by about the amount of grain evacuated, which effectively increases the capacity of the cleaning system by about that amount. As an advantage of early evacuating or removing clean grain from the flow between sieves at a more upstream location in the air flow, the region of the sieve below the device receives less grain and is less saturated, and the area of the sieves downstream of the evacuation device has less obstructed air flow, so as to improve cleaning and ability of the air flow to carry lighter MOG away.

DETAILED DESCRIPTION OF THE INVENTION

Figure 1:
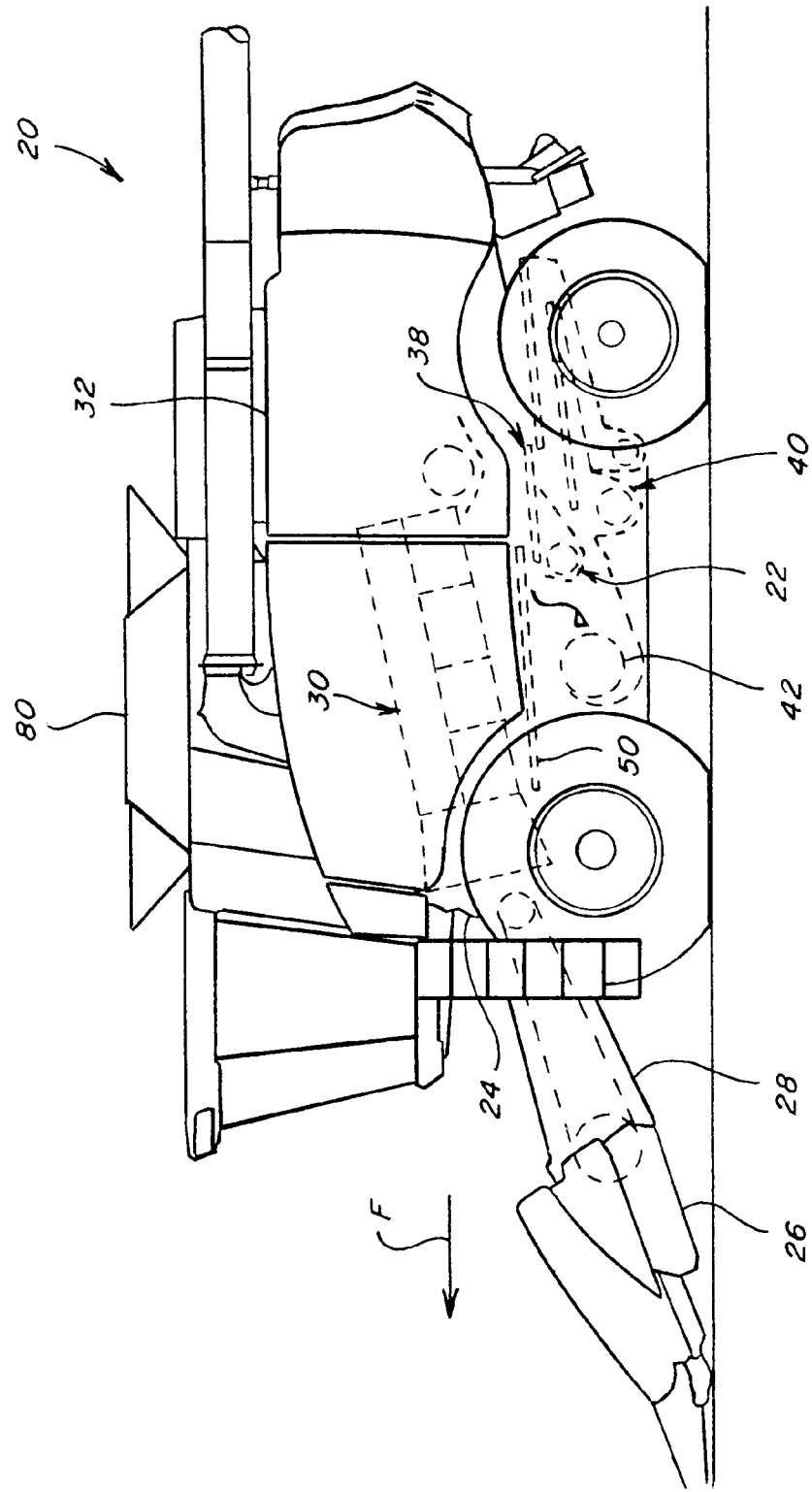
FIG. 1 is a side view of a representative grain harvester incorporating a clean grain evacuating device according to the invention.

Referring now to the drawings, a representative combine harvester 20 including a clean grain evacuation device 22 constructed and operable according to the present invention, is shown. The non-inventive aspects of combine harvester 20 are of conventional, well-known construction and operation, harvester 20 being representative of a wide variety of combine harvesters for grains such as, but not limited to, wheat and other grasses, corn, and legumes such as soybeans. Generally, harvester 20 is a self propelled vehicle having a forward end 24 carrying a crop cutting header 26 operable for severing plants from the ground as harvester 20 is moved in the forward direction, as denoted by arrow F. Header 26 is configured and operable for gathering the cut crops and directing them into a feeder 28 of the harvester. Feeder 28 then conveys the cut crops to a threshing system 30 within a housing 32 of harvester 20.

Figure 2:
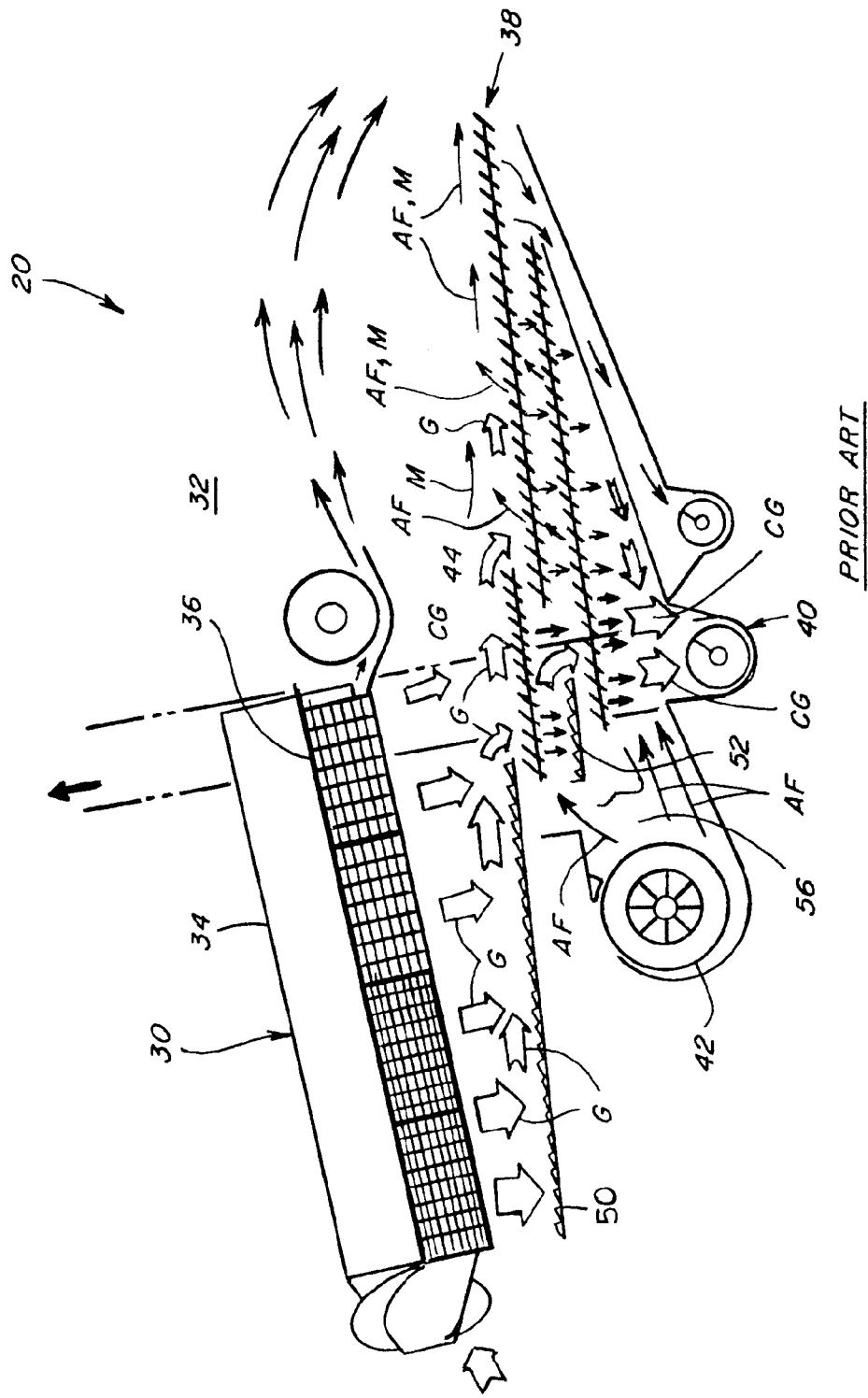
FIG. 2 is a simplified fragmentary internal side view of a representative prior art threshing system and cleaning system of for a harvester such as shown in FIG. 1, shown without the grain cleaning evacuating device, with arrows showing operation of the prior art systems.

Referring also to FIG. 2 which shows harvester 20 in a prior art configuration to illustrated operation without clean grain evacuation device 22 of the invention, threshing system 30 is configured and operable in the well-known manner to separate the grains of the crop from the other plant material or MOG. Essentially, threshing system 30 operates to create a mat of the crop material and passes it through a narrow gap between a rotating rotor 34 and a perforated concave 36 to thresh or separate the grains from larger elements of MOG such as stems, stalks, leaves, pods, and plant fragments, such that a flow of the grain will be discharged from system 30 through the perforations of concave 36, as generally denoted by arrows G in several of the FIGS. This flow of grain G will include some smaller elements of MOG, which is desirably cleaned from the grain by a cleaning system 38 also located within housing 32 generally below threshing system 30. Here, it should be noted that harvester 20 is depicted as a larger capacity machine, configured for handling the maximum grain throughput.

Figure 3:
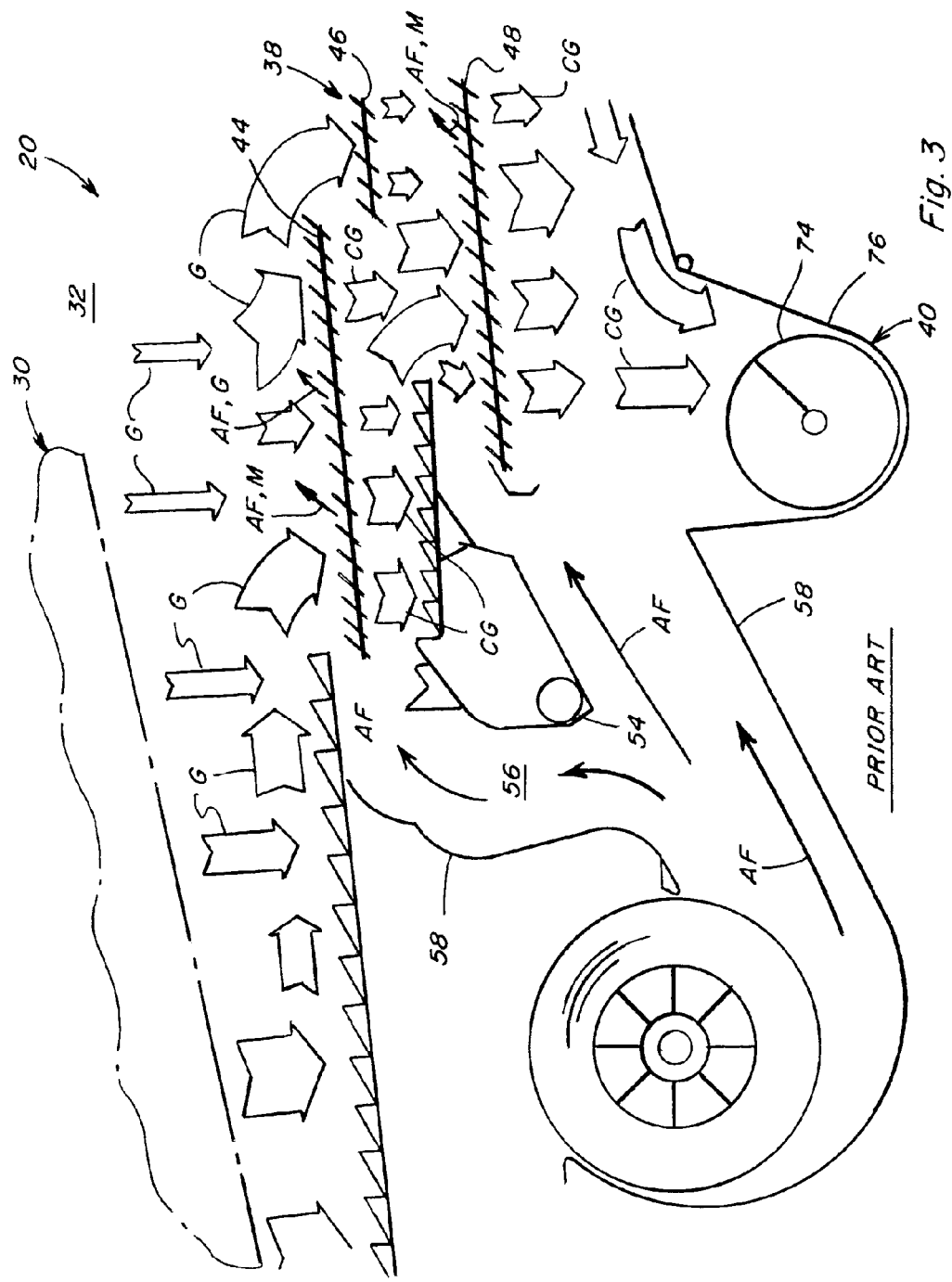
FIG. 3 is an enlarged simplified fragmentary side view of the prior art systems of FIG. 2, with arrows showing operation thereof.
Figure 4:
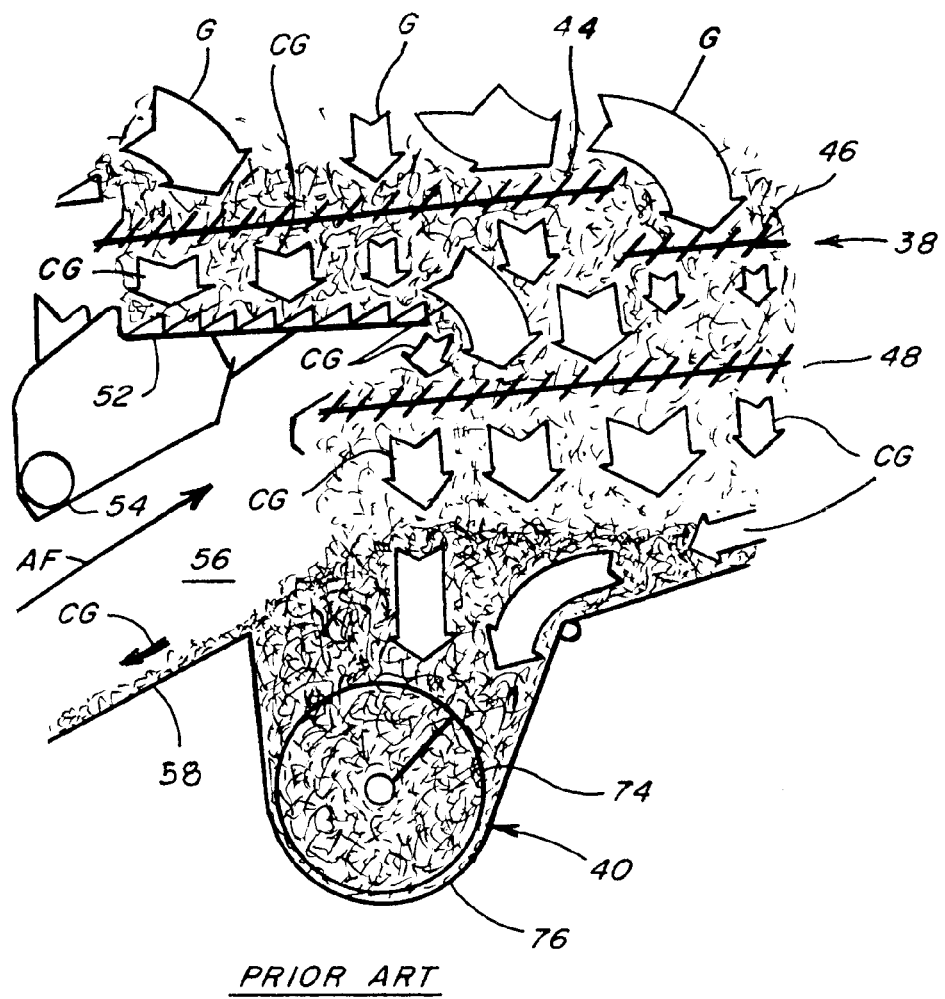
FIG. 4 is an enlarged simplified fragmentary internal side view of the prior art apparatus of FIG. 2, showing grain and MOG with arrows illustrating operation.
Figure 5:
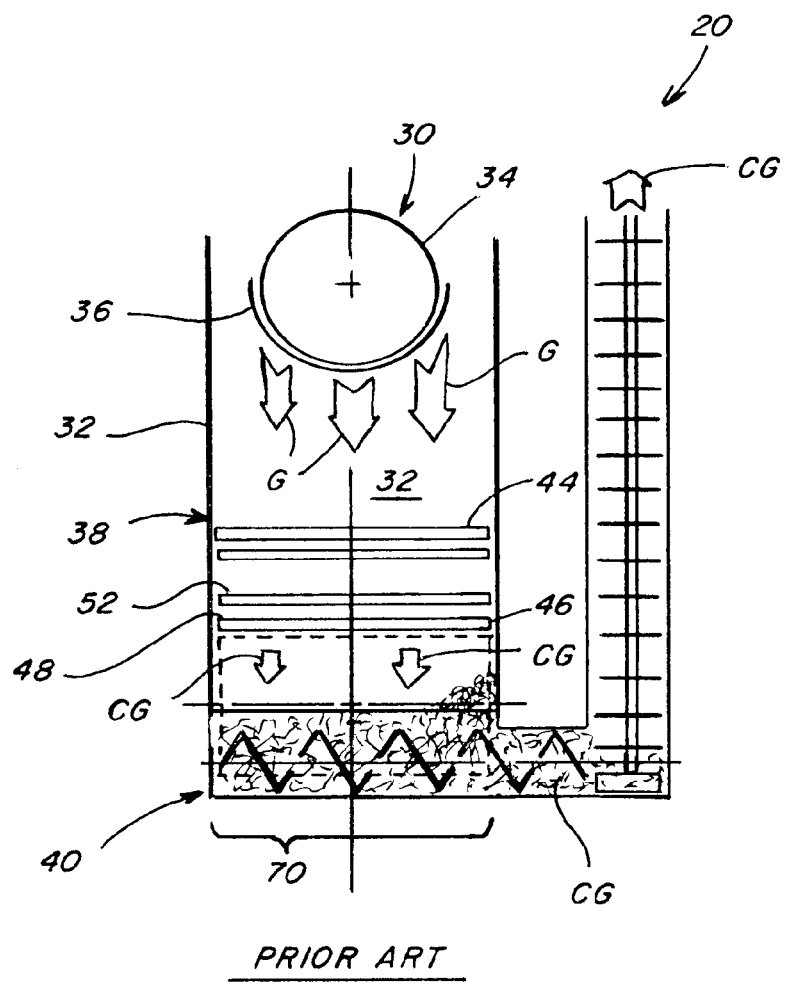
FIG. 5 is an enlarged schematic end view of the prior art systems of FIG. 2, with arrows illustrating operation thereof.

Referring also to FIGS. 3 through 5, which also show harvester 20 in the prior art configuration without clean grain evacuation device 22, the flow of grain G will fall under gravity from threshing system 30 to cleaning system 38. Cleaning system 38 has at least two sieves operable for cleaning the remaining impurities, namely smaller elements or particles of MOG, denoted by arrows M from the flow of grain G and directing the cleaned grain, denoted by arrows CG to a clean grain receiving system 40 located below cleaning system 38 for collection and routing to a clean grain tank or other location.

Harvester 20 includes a cleaning fan 42 disposed forwardly of and below cleaning system 38, configured and operable for generating and directing a flow of air, denoted by arrows AF, upwardly and rearwardly to cleaning system 38 for carrying the MOG M rearwardly from housing 32. Here, as typical for larger harvesters, cleaning system 38 is depicted as a three sieve sequential arrangement, including an uppermost pre-sieve 44, an upper or chaffer sieve 46, and a lower cleaning sieve 48. Sieves 44, 46, and 48 are arranged in a descending sequence, such that flow of grain G will pass onto pre-sieve 44 first, which will be able to sift and clean at least a portion of the grain which will fall toward a forward region of cleaning sieve 48. If the grain volume is high, additional grain will pass over the rear end of sieve 44 and fall to chaffer sieve 46 for cleaning by that sieve, effectively bypassing sieve 44. The grain cleaned by sieve 44 and/or sieve 46 will then fall to sieve 48 for further cleaning. After passing through and cleaning by at least two of the sieves, the cleaned grain flow denoted by arrows CG will flow to clean grain receiving system 40.

Because of the large capacity, length and forward position of threshing system 30, a grain transfer pan 50 is disposed below and generally along the length of the threshing system to receive a portion of flow G and convey it to the uppermost pre-sieve 44. Also, chaffer sieve 46 and cleaning sieve 48 are not completely vertically aligned and thus a second grain transfer pan 52 is disposed beneath a forward end of pre-sieve 44 to catch a portion of the grain flow from that sieve and direct it onto cleaning sieve 48, bypassing chaffer sieve 46.

To effect the cleaning action of sieves 44, 46, and 48, and the conveying action of transfer pans 50 and 52, each is reciprocatingly moved, here in forward and rearward directions, in the well known manner using a suitable mechanism such as a shaker drive apparatus 54 in FIG. 3. Also, each of the sieves includes perforations in the well known manner to allow the passage of air upwardly, and grain downwardly, therethrough also in the well known manner. An air flow path 56 within housing 32 extends from fan 42 to the sieves, and contained by duct surfaces 58, to provide air flow upwardly through the sieves as well as over the tops of the sieves for carrying the MOG away, in the well known manner. The second grain transfer pan 52 is disposed in path 56.

In operation, as best illustrated in FIG. 4, it has been observed that pre-sieve 44 can adequately clean grain such that further cleaning by a second sieve is unnecessary. It has also been found that the region of clean grain receiving system 44 directly under the forward regions of the sieves can become overloaded with grain, such that some of the grain can undesirably flow down lower duct surface 58 so as to be damaged and/or lost. Thus, it would be advantageous to be able to remove or evacuate some of the grain cleaned in the more forward region of the cleaning system, e.g., pre-sieve 44, to reduce the load on the other regions and thereby increase the capacity of the other regions for grain handling and cleaning, and also reduce the possibility of overloading the clean grain receiving system and resulting grain loss via travel to the cleaning fan.

Figure 6:
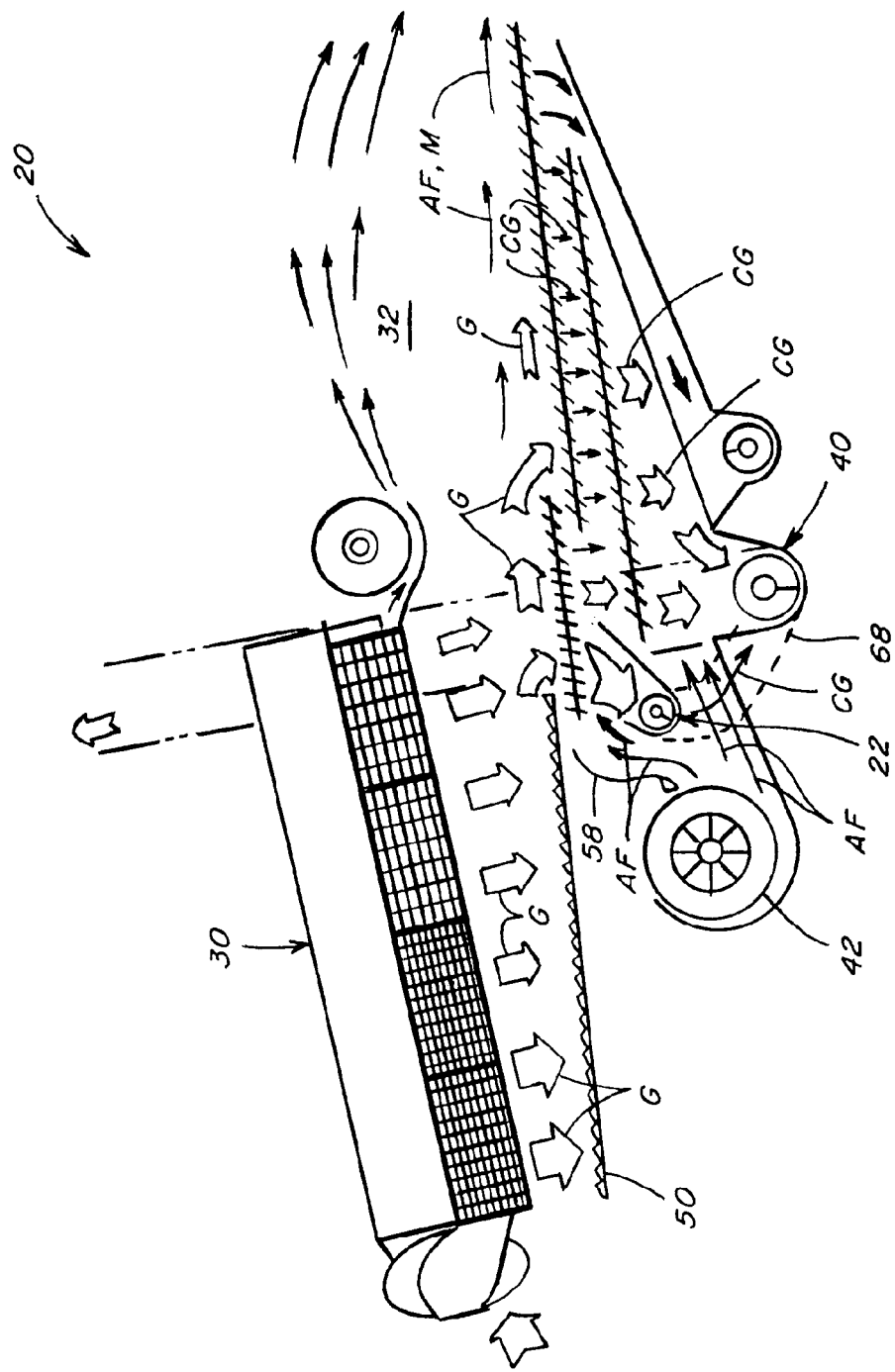
FIG. 6 is a simplified fragmentary internal side view of a threshing system and cleaning system of the harvester of FIG. 1, with the clean grain evacuating device, and arrows showing operation thereof.
Figure 7:
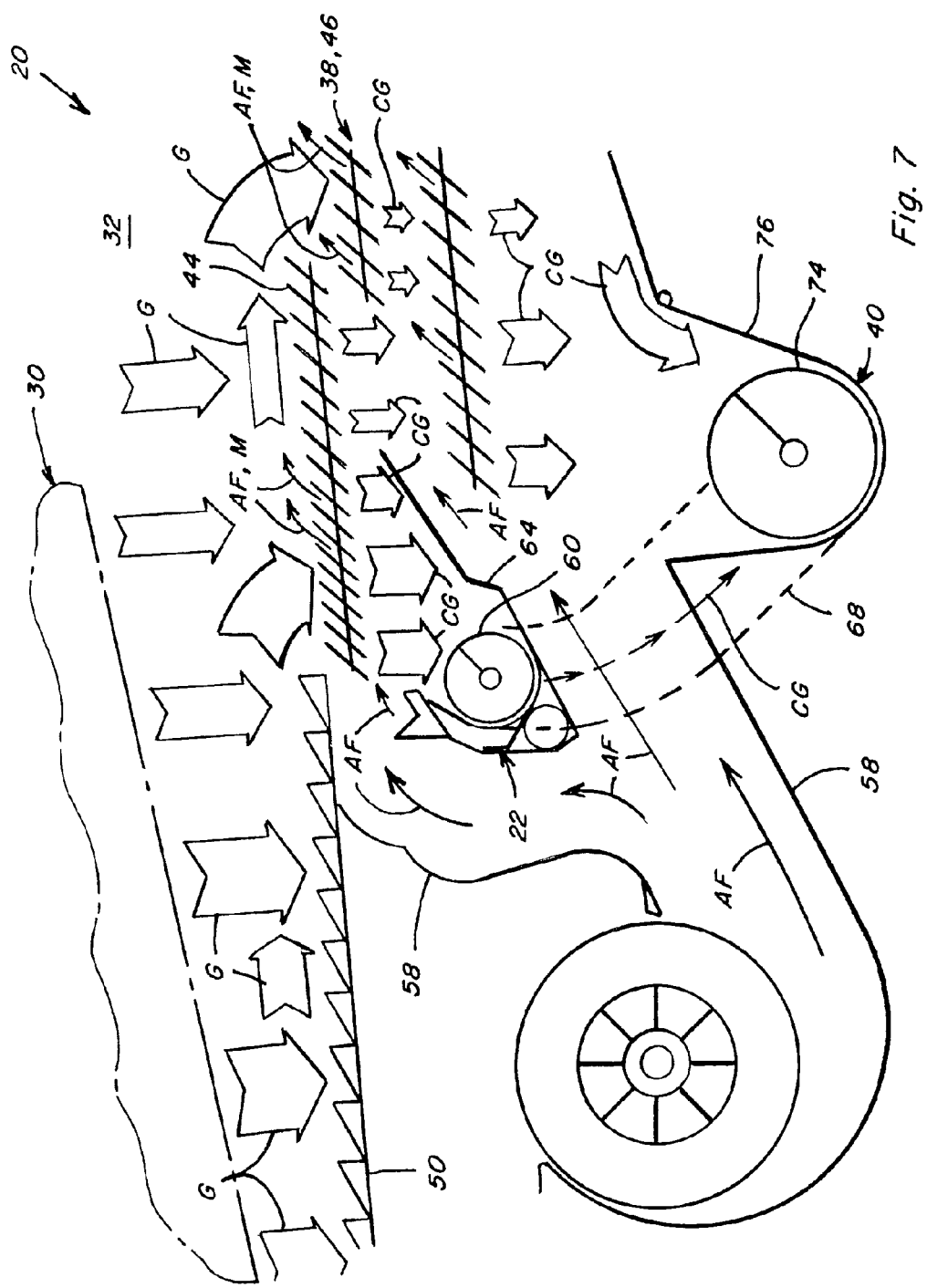
FIG. 7 is an enlarged simplified fragmentary side view of the systems of FIG. 6, with arrows showing operation thereof.
Figure 8:
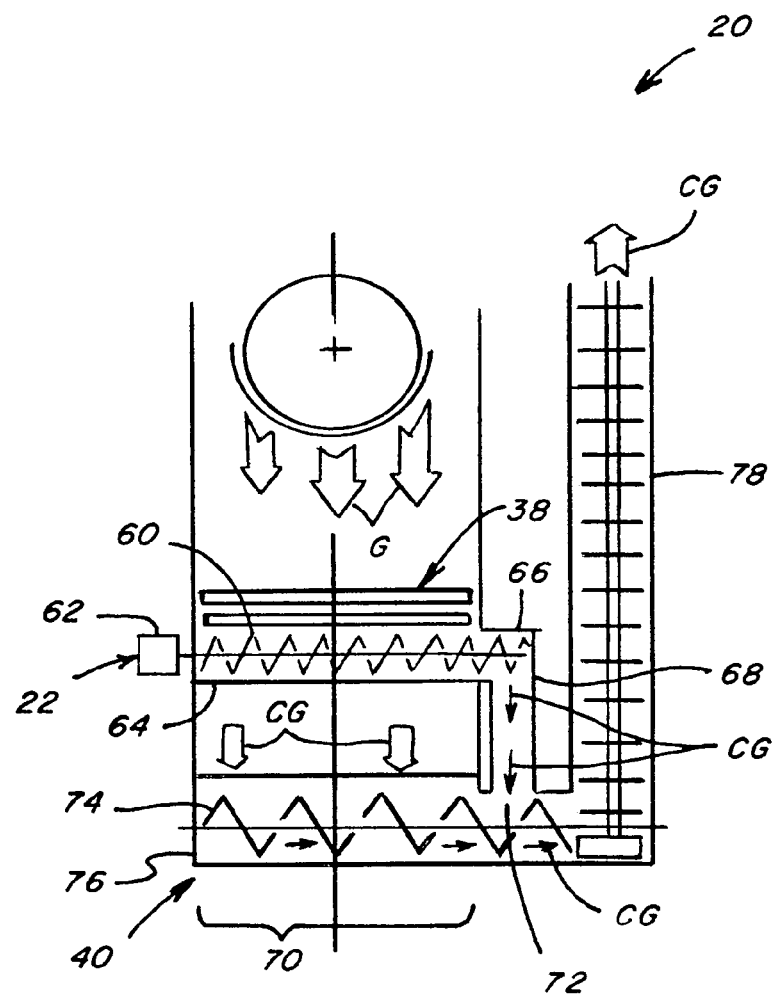
FIG. 8 is an enlarged schematic end view of the systems of FIG. 6, with arrows illustrating operation.

Referring again to FIG. 1 and also to FIGS. 6, 7, and 8, clean grain evacuation device 22 of the invention provides the desired capabilities and overcomes the problems just mentioned, by adding a capability to remove or evacuate grain cleaned early in the cleaning process. Here, for the harvester configuration illustrated, it has been found that placement of device 22 below a forward region of pre-sieve 44 is an advantageous location and allows evacuating adequately cleaned grain from the cleaning system to another location. Here also, device 22 is embodied as an active or powered device including a helical auger 60 rotated by a drive 62 which can be for instance a belt, chain, shaft, or motor drive, as desired. Auger 60 is located in an upwardly facing pan or trough 64 which extends sidewardly the width of sieve 44 and in this embodiment approximately one-third the length thereof, for receiving the grain cleaned by a forward region of that sieve, while allowing the remaining grain to pass onto another sieve for additional cleaning. Device 22 additionally extends sidewardly beyond sieve 44 as denoted by area 66 to a downward path or chute 68 connecting to clean grain receiving system 40. Auger 60 is operable to convey the clean grain that falls into trough 64 to area 66, where it will fall by gravity to clean grain receiving system 40.

Examining FIG. 8 in regard to clean grain receiving system 40, the clean grain from cleaning system 38 will fall onto a first region 70 of system 40 directly below the sieves of cleaning system 38. In contrast, it can be observed that chute 68 delivers the grain evacuated by device 22 at a second region 72, downstream of region 70 in the direction of flow of system 40. This is advantageous as it helps avoid overloading of system 40 in region 70 and the attendant problems of grain loss and damage. Here, clean grain receiving system 40 comprises a helical auger 74 located in a upwardly facing trough 76, although other conveyor construction such as a belt or pneumatic system could be used. System 40 additionally includes a clean grain elevator 78 for receiving the clean grain from auger 74 and carrying it to a grain tank 80 (FIG. 1). As another advantage, it should be apparent that the evacuation according to the invention can be associated with any combination of sieves of a cleaning system.

As another advantage of the invention, it can be observed that evacuation device 22 replaces grain transfer pan 52, and serves to split air flow AF in an advantageous, more concentrated flow to pre-sieve 44 and sieves 46 and 48, for facilitating the desired cleaning capability of the sieves.

In light of all the foregoing, it should thus be apparent to those skilled in the art that there has been shown and described a novel early clean grain evacuation device that provides desired capabilities and overcomes known problems and shortcomings as set forth above. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A harvester having a threshing system configured to separate grain harvested by the harvester from crop residue and direct a downwardly falling flow of the grain to a cleaning system disposed within the harvester, the harvester comprising at least two sieves disposed and configured to sequentially receive and clean the grain;
   a fan assembly configured to direct air along at least one air flow path through the sieves; and
   a clean grain evacuation device disposed to receive a portion of the flow of the grain directly from a first of the sieves and evacuate the received portion of the grain from the sieves wherein the clean grain evacuation device comprises a trough housing having an opening disposed to receive the portion of the flow of grain and a connection to a path leading toward a clean grain receiving system of the harvester, the opening at least one of forward and above a second sieve of the at least two sieves and wherein the at least one air flow path comprises a first path forward of the housing and a second path passing below the trough housing.

2. The harvester of claim 1, wherein the clean grain receiving system is disposed and configured for receiving a flow of the grain from a last of the sieves of the sequence, and the evacuation device being further characterized by apparatus configured to direct the evacuated grain to the clean grain receiving system so as to bypass at least the last of the sieves.

3. The harvester of claim 1, wherein the clean grain evacuation device is disposed beneath a forward portion of the first of the sieves.

4. The harvester of claim 1, wherein the clean grain evacuation device further comprises a helical, auger conveyor disposed in the trough housing.

5. The harvester of claim 4, wherein the auger conveyor is configured to deposit the evacuated grain in a clean grain conveyor of the harvester.

6. The harvester of claim 1, wherein the fan assembly is configured to direct a flow of air along an air flow path upwardly through the sieves, and the clean grain evacuation device is disposed in the air flow path so as to concentrate a portion of the flow of air over the first of the sieves.

7. A harvester, comprising:
   a threshing system configured to separate grain harvested by the harvester from crop residue and direct a flow of the grain to a cleaning system disposed within the harvester, the cleaning system including at least a first sieve disposed and configured to receive the flow of the grain and clean further residue therefrom then direct the flow of the cleaned grain downwardly to a second sieve of the cleaning system for further cleaning of residue therefrom;

a fan assembly configured to direct air along at least one air flow path toward the sieves, and a clean grain evacuation device comprising a trough having a upward facing opening disposed generally below a front portion of the first sieve in a position to receive a portion of the grain cleaned thereby and evacuate the received portion of the grain from the cleaning system through a connection to a clean grain receiving system of the harvester, wherein at least a portion of the air from the at least on flow path passes below the trough.

8. The harvester of claim 7, wherein the clean grain receiving system is disposed and configured for receiving the flow of the grain from a last of the sieves of the cleaning system, and the evacuation device comprising a conveyor configured to direct the evacuated portion of the grain to the clean grain receiving system.

9. The harvester of claim 7, wherein the evacuation device is disposed beneath a forward portion of the first sieve, generally in the at least one air flow path extending to a first region over the first sieve and a second region over the second sieve, the device being configured for concentrating air flow over the first and second regions.

10. The harvester of claim 7, wherein the evacuation device further comprises a helical auger conveyor disposed in the upwardly open trough.

11. The harvester of claim 10, wherein the auger conveyor is configured to deposit the evacuated portion of the grain in a clean grain conveyor of the harvester below the cleaning system.

12. The harvester of claim 11, wherein the clean grain conveyor has a first region positioned for receiving the flow of grain from a last of the sieves, and the evacuation device is configured for directing the evacuated portion of the grain to a second location different from the first region.

13. A grain harvester comprising a threshing system configured to separate grain harvested by the harvester from crop residue and direct a flow of the separated grain to a cleaning system disposed within the harvester including at least two sieves arranged in a generally vertical sequence to sequentially clean the grain, and the cleaning system including a fan assembly configured to direct air along at least one air flow path to the sieves;

at least one clean grain evacuation device disposed in the air flow path below a first of the sieves of the sequence, the at least one clean grain evacuation device comprising a trough housing having an opening for receiving a portion of the flow of the grain directly from the first sieve and having a connecting path toward a clean grain receiving system of the harvester, wherein the trough housing of the at least one clean grain evacuation device is positioned and configured such that the at least one air flow path is separated by the trough housing and at least one air flow path comprises a first path forward of clean grain evacuation device and a second path passing below the clean grain evacuation device.

14. The harvester of claim 13, wherein a last of the sieves in the sequence is configured to deposit the grain cleaned thereby in a predetermined first region of a clean grain conveyor, and the evacuation device comprises a conveyor disposed and configured to convey the received portion of the grain to a predetermined second region of the clean grain conveyor different from the first region.

15. The harvester of claim 14, wherein the clean grain conveyor is configured to convey the grain received thereby in a predetermined direction, and the second region of the clean grain conveyor is downstream of the first region in the predetermined direction.

16. The harvester of claim 13, wherein the evacuation device further comprises a helical auger conveyor disposed in the upwardly open trough housing.

\* \* \* \* \*